US012780689B2

(12) United States Patent
Tanaka et al.

(10) Patent No.: US 12,780,689 B2
(45) Date of Patent: Nov. 3, 2026

(54) FLUID STERILIZATION DEVICE

(71) Applicant: Stanley Electric Co., Ltd., Tokyo (JP)

(72) Inventors: Hideaki Tanaka, Tokyo (JP); Hiroyuki Kato, Tokyo (JP); Kazuhisa Shinno, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 452 days.

(21) Appl. No.: 18/549,072

(22) PCT Filed: Feb. 24, 2022

(86) PCT No.: PCT/JP2022/007749
§ 371 (c)(1),
(2) Date: Sep. 5, 2023

(87) PCT Pub. No.: WO2022/196287
PCT Pub. Date: Sep. 22, 2022

(65) Prior Publication Data

US 2024/0150202 A1 May 9, 2024

(30) Foreign Application Priority Data

Mar. 19, 2021 (JP) ................................ 2021-046358

(51) Int. Cl.
*C02F 1/32* (2023.01)

(52) U.S. Cl.
CPC ...... *C02F 1/325* (2013.01); *C02F 2201/3228* (2013.01); *C02F 2301/026* (2013.01)

(58) Field of Classification Search
None
See application file for complete search history.

(56) References Cited

U.S. PATENT DOCUMENTS

| | | | | |
|---|---|---|---|---|
| 2004/0046127 | A1 | 3/2004 | Wong | |
| 2011/0024365 | A1 | 2/2011 | Yong et al. | |
| 2019/0256379 | A1 | 8/2019 | Kato et al. | |
| 2019/0321505 | A1* | 10/2019 | Kodama | C02F 1/32 |
| 2019/0322546 | A1* | 10/2019 | Sugiyama | A61L 2/10 |
| 2020/0171184 | A1* | 6/2020 | Tanaka | C02F 1/325 |

FOREIGN PATENT DOCUMENTS

| | | | | |
|---|---|---|---|---|
| CN | 108793532 | A | 11/2018 | |
| CN | 111265680 | A * | 6/2020 | A61L 2/10 |
| JP | 2019-141292 | A | 8/2019 | |

(Continued)

OTHER PUBLICATIONS

International Search Report for PCT/JP2022/007749 dated Apr. 19, 2022.

(Continued)

*Primary Examiner* — Regina M Yoo
(74) *Attorney, Agent, or Firm* — Kenealy Vaidya LLP

(57) ABSTRACT

A liquid sterilization device includes: an outer tube through which a fluid to be sterilized flows from one end side to the other end side in the axial direction; a flow-regulating plate that has a plurality of tapered holes having diameters thereof increasing from one end side toward the other end side in the axial direction; and a light source that applies ultraviolet light to a sterilization space on the other end side relative to the flow-regulating plate.

12 Claims, 7 Drawing Sheets

(56) References Cited

FOREIGN PATENT DOCUMENTS

| | | | | | |
|---|---|---|---|---|---|
| JP | 2020-092856 | A | | 6/2020 | |
| JP | 2021-028056 | A | | 2/2021 | |
| KR | 20180081571 | A | * | 7/2018 | ............... A61L 2/26 |
| MY | 129047 | A | * | 3/2007 | |
| WO | 2021/020536 | A1 | | 2/2021 | |
| WO | WO-2021085143 | A1 | * | 5/2021 | ............... A61L 2/10 |

OTHER PUBLICATIONS

COffice Action for the corresponding European Patent Application No. 22771043.1 (Jul. 26, 2024).

European Search Report for European Patent Application No. 22771043.1 (Jul. 15, 2024).

* cited by examiner

FLUID STERILIZATION DEVICE

This application is a U.S. National Stage Application under 35 U.S.C § 371 of International Patent Application No. PCT/JP2022/007749 filed Feb. 24, 2022, which claims the benefit of priority under 35 U.S.C. § 119 to Japanese Patent Application No. 2021-046358 filed Mar. 19, 2021, the disclosures of all of which are hereby incorporated by reference in their entireties.

TECHNICAL FIELD

The present invention relates to a fluid sterilization device that sterilizes a fluid flowing through a tubular passage by irradiating the fluid with ultraviolet light.

BACKGROUND ART

Patent Literature 1 discloses a fluid sterilization device that sterilizes a fluid flowing through a tubular passage by irradiating the fluid with ultraviolet light. In this fluid sterilization device, a flow-regulating plate having a plurality of through holes is disposed on the inflow port side of the tubular passage, so that the fluid flows through a sterilization space in a regulated state, thereby suppressing unevenness in the amount of ultraviolet light irradiation to the fluid flowing through the tubular passage.

CITATION LIST

Patent Literature

Patent Literature 1: Japanese Patent Application Laid-Open No. 2020-92856

SUMMARY OF INVENTION

Technical Problem

In the flow-regulating plate in Patent Literature 1, the through holes in the central part have larger diameters than the through holes in the peripheral part in the radial direction of the flow-regulating plate. This promotes uniformity of the fluid velocity distribution in the radial direction on the downstream side of the flow-regulating plate. The through holes in the flow-regulating plate in Patent Literature 1 are all cylindrical holes.

Meanwhile, it has been proposed to dispose a total of two flow-regulating plates, one each on the upstream side and the downstream side with an interval provided therebetween in the axial direction. In such a case, the flow-regulating plate on the upstream side has a plurality of cylindrical first through holes in a relatively central part in the radial direction, and the flow-regulating plate on the downstream side has a plurality of cylindrical second through holes, which have larger diameters than those of the first through holes, distributed over the entire surface. As a result, a fluid flowing into the tubular passage through the inflow port can be regulated over a relatively short length in the axial direction.

An object of the present invention is to provide a fluid sterilization device capable of achieving high flow regulating function by a flow-regulating plate so as to permit a further size reduction in the axial direction.

Solution to Problem

A fluid sterilization device in accordance with the present invention includes:

- a tube body having a tubular passage through which a fluid flowing in through an inflow port on one end side in an axial direction flows in the axial direction to an outflow port on the other end side in the axial direction;
- a flow-regulating plate which has a plurality of tapered holes having diameters thereof increasing from the one end side toward the other end side in the axial direction and which is disposed in the tubular passage to divide the tubular passage into an introduction space on the one end side and a sterilization space on the other end side; and
- a light source which irradiates the sterilization space with ultraviolet light.

Advantageous Effects of Invention

According to the present invention, the through holes of the flow-regulating plate are formed of tapered holes having the diameters thereof increasing in a fluid flowing direction in the tubular passage, thus making it possible to achieve a high flow regulating function. As a result, the dimension of a fluid sterilization device in the axial direction can be reduced.

DESCRIPTION OF EMBODIMENTS

Figure 1A:
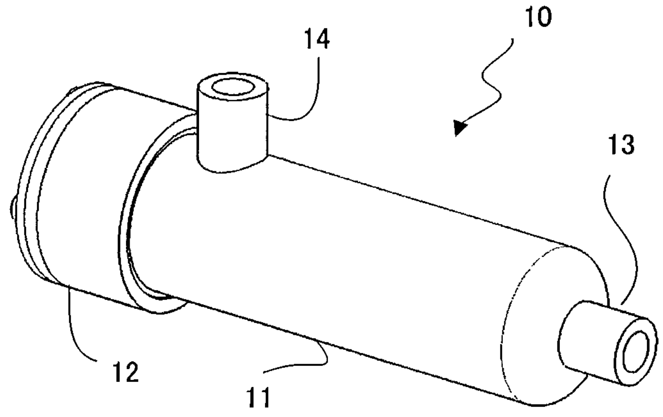
FIG. 1A is a perspective view of a liquid sterilization device.

The following will describe a plurality of embodiments of the present invention. It is needless to say that the present invention is not limited to these embodiments. The same reference numerals are used for components that are common among a plurality of embodiments, and the descriptions of components with the same reference numerals that have already been described in a preceding embodiment will be omitted in a subsequent embodiment.

(Configuration)

Figure 1B:
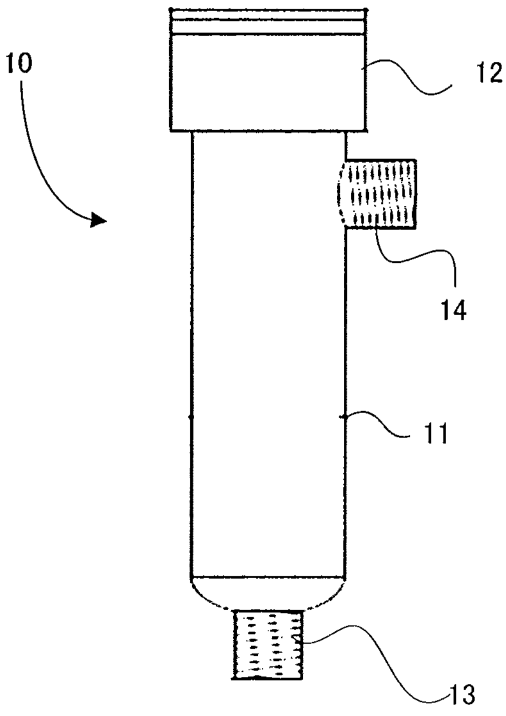
FIG. 1B is a front view of the liquid sterilization device.
Figure 2:
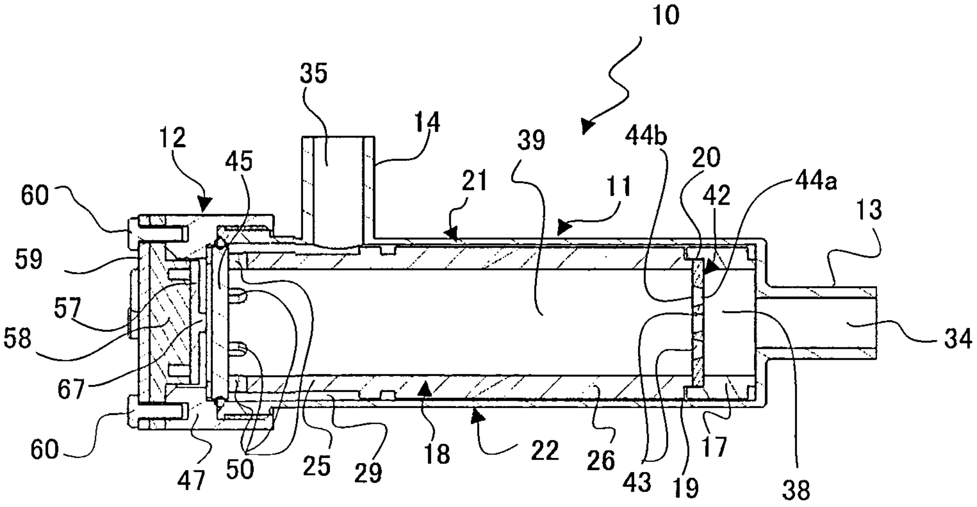
FIG. 2 is a longitudinal sectional view of the liquid sterilization device.
Figure 3:
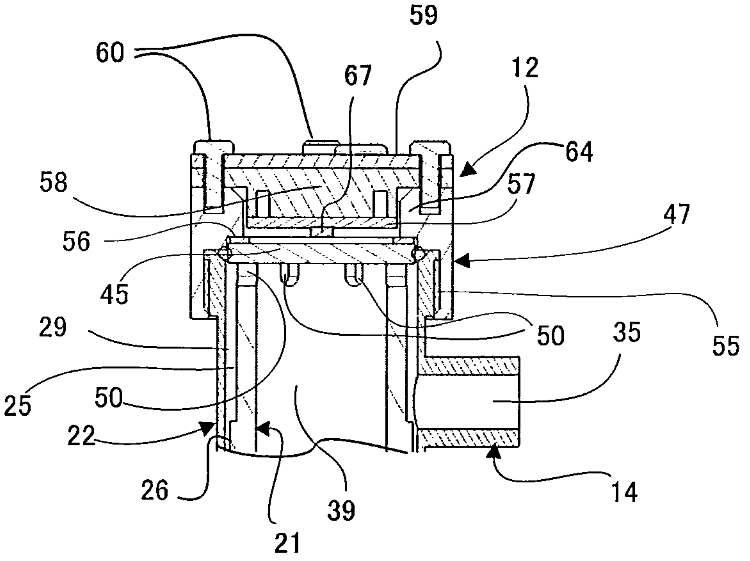
FIG. 3 is an enlarged view of an end portion of the liquid sterilization device on the light source side.

FIG. 1A is a perspective view of a liquid sterilization device 10. FIG. 1B is a front view of the liquid sterilization device 10. FIG. 2 is a longitudinal sectional view of the liquid sterilization device 10. FIG. 3 is an enlarged view of an end portion of the liquid sterilization device 10 on a light source 12 side.

The liquid sterilization device 10 includes a housing 11, the light source 12, a lead-in port section 13, and a lead-out port section 14. The lead-in port section 13 and the lead-out port section 14 are formed integrally with the housing 11. The liquid sterilization device 10 is typically placed with the axial direction thereof aligned with a vertical direction, the light source 12 being on the upper side (vertical placement), as illustrated in FIG. 1B.

The liquid sterilization device 10 is an example of a fluid sterilization device, and sterilizes water as a liquid, which is also a fluid. The liquid sterilization device 10 is installed to, for example, a water storage tank of an ice machine or the like, a water pipe, a water heater, a water server, a circulation device (chiller cooling water), and a drink server.

Water sterilized by the liquid sterilization device 10 is usually used for drinking. Sterilization in a circulation device is performed to prevent the propagation of bacteria in circulating water, which increases the viscosity of the circulating water, leading to power loss.

The lead-in port section 13 and the lead-out port section 14 are circumferentially threaded for connection to a tube (not illustrated) in an apparatus in which the liquid sterilization device 10 is to be disposed (FIG. 1). The water to be sterilized by the ultraviolet light of the light source 12 of the liquid sterilization device 10 flows from the lead-in port section 13 side (one end side) to the lead-out port section 14 side (the other end side) in the axial direction through a tubular passage which is formed in the housing 11 and composed of a lead-in side space 38 and a sterilization space 39.

The light source 12 is attached to the housing, with the central axis thereof aligned with the central axis of the housing 11 on the other end side in the axial direction of the liquid sterilization device 10. The lead-in port section 13 is provided on an end portion on the one end side of the housing 11 in the axial direction. The lead-out port section 14 is provided on the side portion of the housing 11 in such a manner as to project in the radial direction at a position spaced away by a predetermined distance toward one end from the other end of the housing 11 in the axial direction.

The housing 11 has an inner tube 21 and an outer tube 22, which are coaxially disposed. The inner tube 21 and the outer tube 22 are both straight tubes. The lead-in port section 13 and the lead-out port section 14 are provided integrally with the outer tube 22. A lead-in port 34 and a lead-out port 35 are defined on the inner circumferential sides of the lead-in port section 13 and the lead-out port section 14, respectively, and provide communication between the inside and the outside of the outer tube 22.

The inner tube 21 has a one-end-side inner tube member 17 and an other-end-side tube member 18, which are joined to each other by the tightening force of a fixing nut 47, which will be described later, from one end side and the other end side in the axial direction. The inner tube 21 is fitted by insertion into the outer tube 22 from the opening at the other end side of the outer tube 22. The one-end-side inner tube member 17 and the other-end-side tube member 18 are open at both ends in the axial direction.

The other-end-side tube member 18 has a small-diameter portion 25 on the other end side and a large-diameter portion 26 on the one end side in the axial direction. An annular space 29 is formed between the inner circumference of the outer tube 22 and the outer circumference of the small-diameter portion 25. The boundary between the small-diameter portion 25 and the large-diameter portion 26 has a step portion. The step portion is positioned closer to the one end side than to the lead-out port 35 in the axial direction. Thus, the lead-out port 35 is entirely exposed to the annular space 29 without being covered by the large-diameter portion 26.

In this embodiment, the step portion projects from the small-diameter portion 25 in such a manner as to be perpendicular to the axial direction of the inner tube 21, i.e., parallel to the radial direction of the inner tube 21. The step portion can alternatively be a tapered step portion, in place of the vertical step portion, to ensure smooth change of direction of a water flow from the annular space 29 to the lead-out port 35.

A flow-regulating plate 42 has the circumferential edge thereof fitted by insertion into an annular groove 20 formed on the inner circumferential side of a joint portion 19 between the one-end-side inner tube member 17 and the other-end-side tube member 18, and is pinched by the mutual joining force of the one-end-side inner tube member 17 and the other-end-side tube member 18 from both sides in the axial direction. This joining force is generated by the tightening force in the axial direction of the fixing nut 47, which will be described later.

Figure 4A:
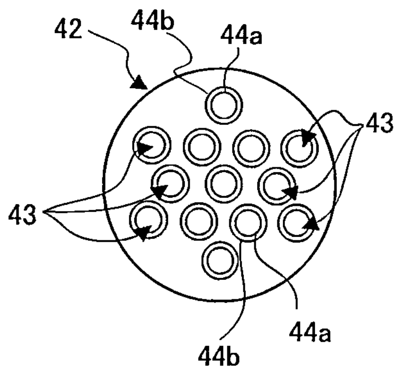
FIG. 4A is a view of a flow-regulating plate observed in the axial direction from the other end side.
Figure 4B:
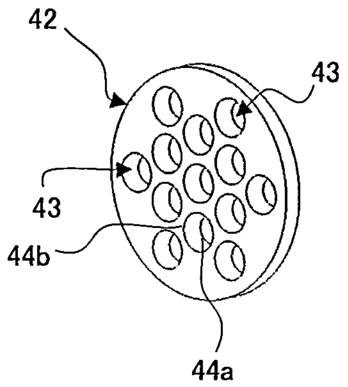
FIG. 4B is a perspective view of the flow-regulating plate observed at an angle in the axial direction from the other end side.

The flow-regulating plate 42 divides the tubular passage defined on the inner circumferential side by the inner tube 21 into a lead-in side space 38 on the one end side and the sterilization space 39 on the other end side. FIG. 4A and FIG. 4B illustrate the flow-regulating plate 42 observed in the axial direction from the other end side and at an angle from the other end, respectively. Referring to FIG. 2, FIG. 4A, and FIG. 4B, the flow-regulating plate 42 has a plurality of tapered holes 43 penetrating in the axial direction. The tapered holes 43 are open on both the one end side and the other end side in the axial direction through circular upstream-side openings 44*a* and downstream-side openings 44*b*. The diameters of the upstream-side openings 44*a* are smaller than the diameters of the downstream-side openings 44*b*. In other words, the diameters of the tapered holes 43 gradually increase toward the other end side from the one end side in the axial direction.

Referring to FIG. 3, the other-end-side tube member 18 has a plurality of notch grooves 50 with U-shaped cross sections provided at equal angular intervals in the circumferential direction on the circumferential end face on the other end side in the axial direction. A quartz plate 45 has a peripheral edge portion thereof on one end side fitted by insertion into the inner circumferential step portion of the other end portion of the outer tube 22 so as to be brought into contact with the circumferential end surface of the other-end-side tube member 18, and has an annular spacer 56 in contact with the circumferential edge thereof on the other end side.

A circuit board 57 is fitted by insertion into a through hole of the fixing nut 47, has a surface thereof on the quartz plate 45 side, and has a light source 67 at the center of the surface. A heat sink 58 has one end thereof inserted into the through hole of the fixing nut 47 in the axial direction, has the flange portion thereof on the other end side brought into contact with the end face of the fixing nut 47, and is fixed to the end face of the fixing nut 47 by a plurality of screws 60.

The fixing nut 47 is secured to the housing 11, which is a tubular body, by being screwed to a thread groove formed in the outer circumferential portion of the axial other end portion of the outer tube 22. This screwing moves the fixing nut 47 from the other end side to the one end side in the axial direction, and tightens, in the axial direction, the one-end-side inner tube member 17 and the other-end-side tube member 18 accommodated in the outer tube 22 to join these two tube members. Thus, the one-end-side inner tube member 17 and the other-end-side tube member 18 are joined to each other and pinch the circumferential edge of the flow-regulating plate 42 in the annular groove 20 in the axial direction.

(Bactericidal Action)

Water as a fluid to be sterilized (not illustrated) is pressure-fed by a pump (not illustrated) into the lead-in port 34. Then, the water flows through the lead-in port 34 into the lead-in side space 38, where the water spreads in the radial direction of the inner tube 21 due to an increase in the passage cross-sectional area.

After that, the water passes through the tapered holes 43 of the flow-regulating plate 42 and enters into the sterilization space 39. When passing through the tapered holes 43, the water spreads in the radial direction, which is the vertical direction with respect to the axial direction, and spreads at a spreading angle based on the taper angle θ (FIG. 9) of the tapered holes 43 after the water is ejected through the tapered holes 43. As a result, on the other end side (downstream side) of the flow-regulating plate 42, the water streams ejected through adjacent tapered holes 43 into the sterilization space 39 come into contact with each other at an appropriate tilt angle thereby to suppress the diffusion in the radial direction, thus turning into a regulated water flow parallel to the axial direction.

The light source 67 applies ultraviolet light to water in the sterilization space 39 through the quartz plate 45 from the other end side in the axial direction. Thus, bacteria and the like mixed in the water are sterilized. The water impinges on the quartz plate 45, changes the direction thereof from the axial direction to the radially outward direction, and enters into the annular space 29 through the notch grooves 50. In the annular space 29, the water flows in the axial direction from the other end side to the one end side, which is opposite to the flow inside of the sterilization space 39, changes the flow direction thereof to the radially outward direction at the place of the lead-out port 35, and flows out of the liquid sterilization device 10 through the lead-out port 35.

The notch grooves 50 provide communication between the upper end of the sterilization space 39 and the upper end of the annular space 29, thus preventing the occurrence of stagnant air or stagnant water at the upper portions of the sterilization space 39 and the annular space 29 (the upper portion in the vertical placement in FIG. 1).

If ultraviolet light passes through air, the intensity thereof is significantly reduced, causing a decrease in sterilizing power. Further, if water is trapped and retained in the sterilization space 39, the retained water becomes residual water in the sterilization space 39 after the operation of the liquid sterilization device 10 is finished, and bacteria propagate in the residual water if the non-operation time becomes long. Therefore, when restarting the operation, it is necessary to wait until the residual water with the propagated bacteria therein is discharged from the liquid sterilization device 10 before using sterilized water.

In the liquid sterilization device 10, the notch grooves 50 on the other end of the other-end-side tube member 18 prevent air and fluid from staying in the housing 11, thus making it possible to prevent a decrease in the sterilizing power of the liquid sterilization device 10 and the occurrence of residual water.

(Flow Velocity Distribution Diagrams)

Figure 5:
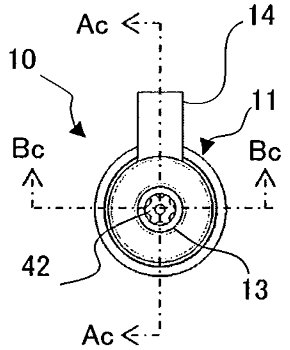
FIG. 5 is a view in the cross-sectional direction.

FIG. 5 is a diagram illustrating cross-sectional directions. FIG. 6A, FIG. 6B, FIG. 6C and FIG. 6D are diagrams illustrating the flow velocity distributions in the fluid sterilization devices of Comparative Examples 1, 2, and 3 and the liquid sterilization device 10 of the embodiment, respectively, taken along the Ac-Ac arrow cross section in FIG. 5. FIG. 7A, FIG. 7B, FIG. 7C and FIG. 7D are diagrams illustrating the flow velocity distributions in the fluid sterilization devices of Comparative Examples 1, 2, and 3 and the liquid sterilization device 10 of the embodiment, respectively, taken along the Bc-Bc arrow cross section in FIG. 5.

The flow velocity distributions in these diagrams have been obtained by simulations performed by the inventors, and the flow velocities are indicated in a plurality of stages. These diagrams indicate that the whiter the areas are, the higher the flow velocities are.

Figure 6A:
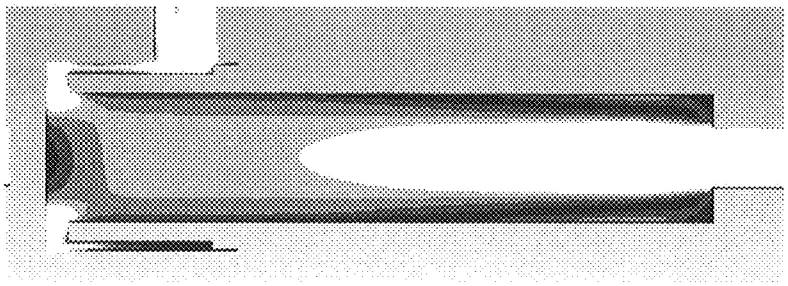
FIG. 6A is a diagram illustrating the flow velocity distribution in the liquid sterilization device in Comparative Example 1, taken along the Ac-Ac arrow cross section in FIG. 5.
Figure 6B:
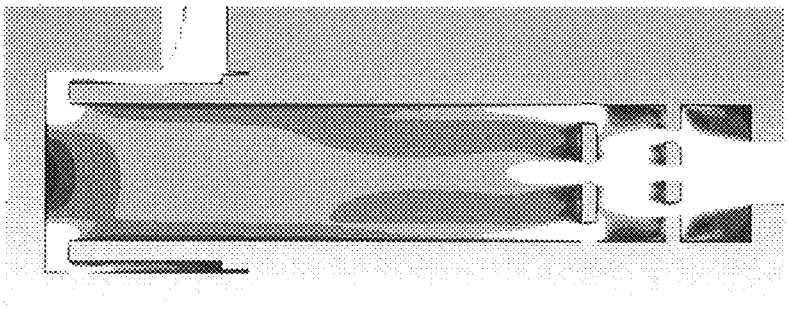
FIG. 6B is a diagram illustrating the flow velocity distribution in the liquid sterilization device in Comparative Example 2, taken along the Ac-Ac arrow cross section in FIG. 5.
Figure 6C:
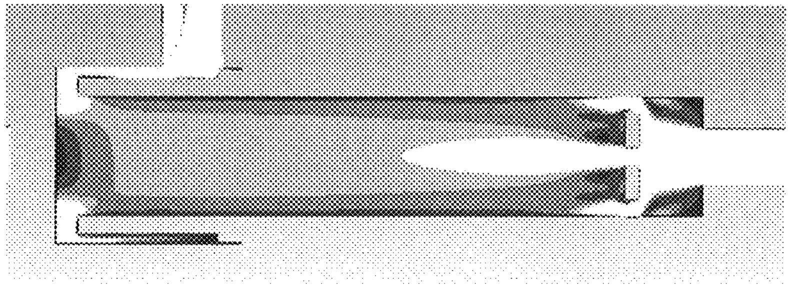
FIG. 6C is a diagram illustrating the flow velocity distribution in the liquid sterilization device in Comparative Example 3, taken along the Ac-Ac arrow cross section in FIG. 5.
Figure 6D:
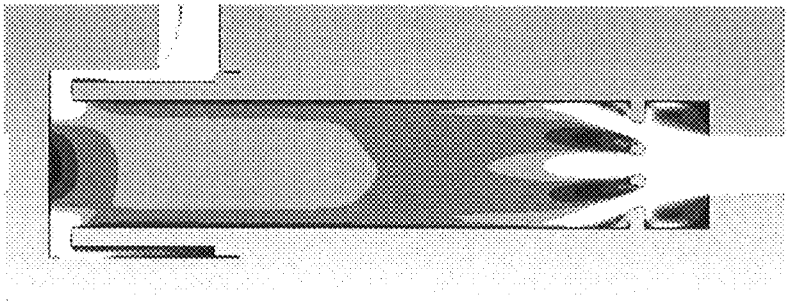
FIG. 6D is a diagram illustrating the flow velocity distribution in the liquid sterilization device in an embodiment, taken along the Ac-Ac arrow cross section in FIG. 5.
Figure 7A:
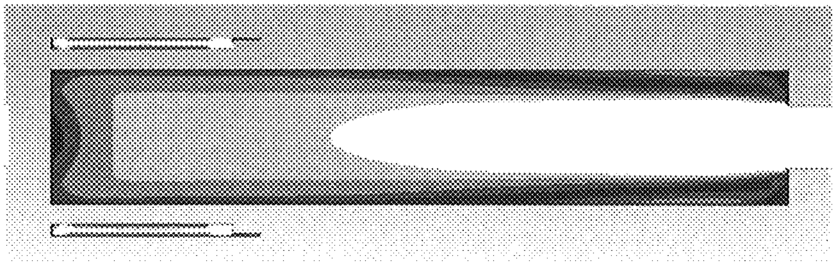
FIG. 7A is a diagram illustrating the flow velocity distribution in the liquid sterilization device in Comparative Example 1, taken along the Bc-Bc arrow cross section in FIG. 5.
Figure 7B:
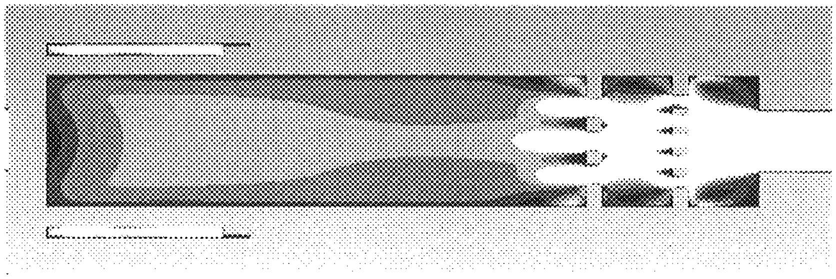
FIG. 7B is a diagram illustrating the flow velocity distribution in the liquid sterilization device in Comparative Example 2, taken along the Bc-Bc arrow cross section in FIG. 5.
Figure 7C:
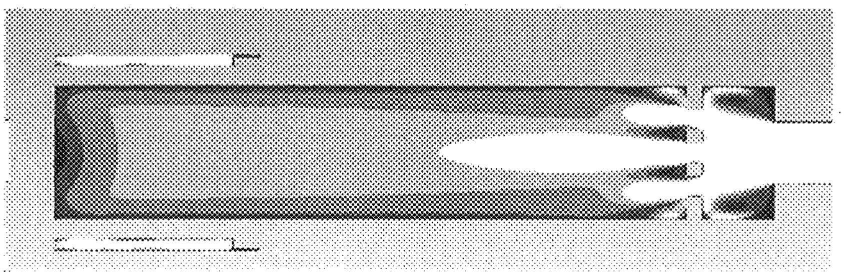
FIG. 7C is a diagram illustrating the flow velocity distribution in the liquid sterilization device in Comparative Example 3, taken along the Bc-Bc arrow cross section in FIG. 5.
Figure 7D:
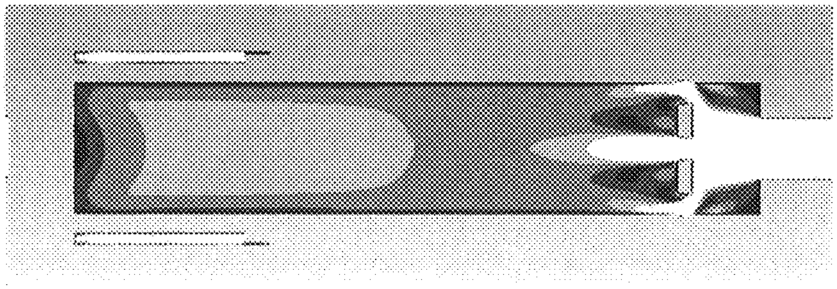
FIG. 7D is a diagram illustrating the flow velocity distribution in the liquid sterilization device in the embodiment, taken along the Bc-Bc arrow cross section in FIG. 5.

Comparative Example 1 corresponds to the flow velocity distribution diagram obtained when the flow-regulating plate is absent. Comparative Example 2 corresponds to the flow velocity distribution diagram obtained when two flow-regulating plates are provided. The through holes in the axial direction of the two flow-regulating plates of Comparative Example 2 are both cylindrical holes, and the diameters of the cylindrical holes of the flow-regulating plate on the upstream side are smaller than those of the flow-regulating plate on the downstream side. Comparative Example 3 is an example having one flow-regulating plate with cylindrical through holes. Meanwhile, the liquid sterilization device 10 of the embodiment in FIG. 6D and FIG. 7D is provided with the flow-regulating plate 42. The taper angle θ (FIG. 9) of the tapered holes 43 in the flow-regulating plate 42 is set to 14°.

In Comparative Examples 1 (FIG. 6A and FIG. 7A) and 3 (FIG. 6C and FIG. 7C), the white areas extend long toward the other end side, whereas in Comparative Example 2 (FIG. 6B and FIG. 7B), the white area is short. The small white area in the tubular passage means a higher level of flow regulation. It is seen that the axial position at which a fluid ejected from one flow-regulating plate in the liquid sterilization device 10 of the embodiment (FIGS. 6D and 7D) reaches a stable regulated state following the ejection is substantially the axial position of the flow-regulating plate on the downstream side in Comparative Example 2 (FIG. 6B and FIG. 7B). This indicates that using the flow-regulating plate 42 of the liquid sterilization device 10 allows the liquid sterilization device 10 to be reduced in size in the axial direction while obtaining the same flow regulating effect as in the case where two flow-regulating plates having different hole diameters are used.

The present inventors have further obtained the following findings through simulation tests. In Comparative Example 2 (using the two flow-regulating plates), when the length of the flow regulating chamber (the length of the portion upstream from the flow-regulating plates) is reduced from 10 mm to 5 mm, the effect of homogenizing the flow velocity distribution weakens. In contrast, it has been found that, in the liquid sterilization device 10 of the embodiment, even when the length of the flow regulating chamber (the length of the portion upstream from the flow-regulating plate, which corresponds to the length of the one-end-side inner tube member 17) is reduced from 10 mm to 5 mm, the effect of homogenizing the flow velocity distribution can be maintained.

Further, in FIG. 6D and FIG. 7D, the taper angle θ (FIG. 9) of the tapered holes 43 was set to 14°, but even when the taper angle θ is increased to 18.4°, substantially the same effect as that in the case where the taper angle θ is set to 14° is obtained. The preferred range of the taper angle θ will be described next with reference to FIG. 9.

(Range of the Taper Angle θ)

Figure 9:
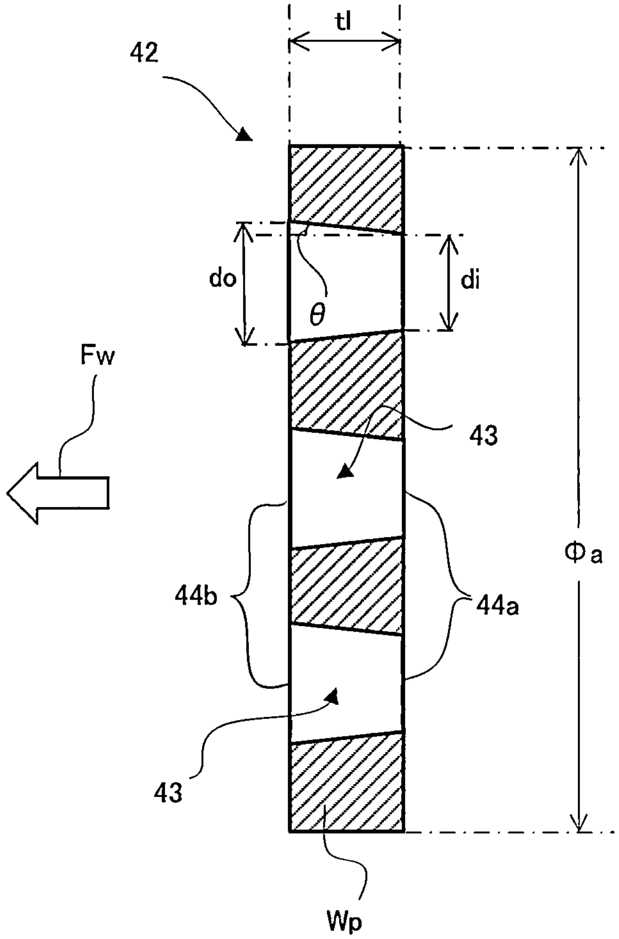
FIG. 9 is an explanatory diagram illustrating a preferred range of taper angles of tapered holes.

FIG. 9 is an explanatory diagram illustrating the preferred range of the taper angle θ of the tapered holes 43. The taper angle θ of the tapered hole 43 is defined as the intersection angle between the side edge line of the tapered hole 43 and the central axis line of the flow-regulating plate 42 in the cross section of the flow-regulating plate 42 when the flow-regulating plate 42 is cut by a plane including the central axis line thereof (the cross section illustrated in FIG. 9). The direction of the central axis line of the flow-regulating plate 42 and the axial direction of the liquid sterilization device 10 are parallel to each other.

The definitions of the symbols in FIG. 9 are as shown below.

- tl: thickness of the flow-regulating plate 42 (=dimension of the flow-regulating plate 42 in the direction of the central axis line)
- di: diameter of the upstream-side opening 44*a*
- do: diameter of the downstream-side opening 44*b*
- Fw: flowing direction of main flow water in tubular passage
- ϕa: diameter of the flow-regulating plate 42
- Ra: predetermined value below 1 (example: 0.65)

Expression 1 given below is introduced to set the preferred range of the taper angle θ.

$$(2 \cdot tl)/(di+do)<Ra \qquad \text{Expression 1:}$$

The reason why 0.65 is desirable for Ra is as follows. A case is assumed, where di=do in the left side of Expression 1. di=do means cylindrical holes instead of the tapered holes 43. If Ra≥0.65 is set when a fluid sterilization device includes only one flow-regulating plate, and a plurality of through holes of the only one flow-regulating plate are all cylindrical holes of equal diameters, then inappropriate flow regulation will result on the downstream side of the flow-regulating plate, i.e., poor uniformity in the flow velocity distribution in the radial direction of the tubular passage will result, leading to an inadequate function as the flow-regulating plate. For this reason, 0.65 has been selected for Ra.

The value of Ra has to be below 1, because, if Ra≥1, then the thickness of the flow-regulating plate will be larger than the diameter of the through holes, and the through holes become orifices, leading to a significant decrease in flow velocity. The flow-regulating plate is required to have a function as a partition wall Wp (FIG. 9) in order to perform the flow regulating function.

Regarding the relationship between the taper angle θ and each parameter of Expression 1, there is the relationship of Expression 2 given below.

$$\tan \theta=(do-di)/(2 \cdot tl) \qquad \text{Expression 2:}$$

For example, if di=3 mm, do=4 mm, and tl=2 mm, then Expression 1 is satisfied, and θ=140 is obtained. Further, if di=3 mm, do=5 mm, and tl=2 mm, then Expression 1 is satisfied, and θ=26.5° is obtained. The taper angles θ=140 and 18.4° described in relation to FIG. 6D and FIG. 7D mentioned above are also values within the range that satisfies the conditions of Expression 1.

The preferred range of the taper angle θ is summarized as a range of the taper angle θ which satisfies the requirements of Expression 1 and which is derived from Expression 2. Since a plurality of tapered holes 43 must be formed in the flow-regulating plate 42, do<ϕa naturally applies.

(Another Flow-Regulating Plate)

Figure 8:
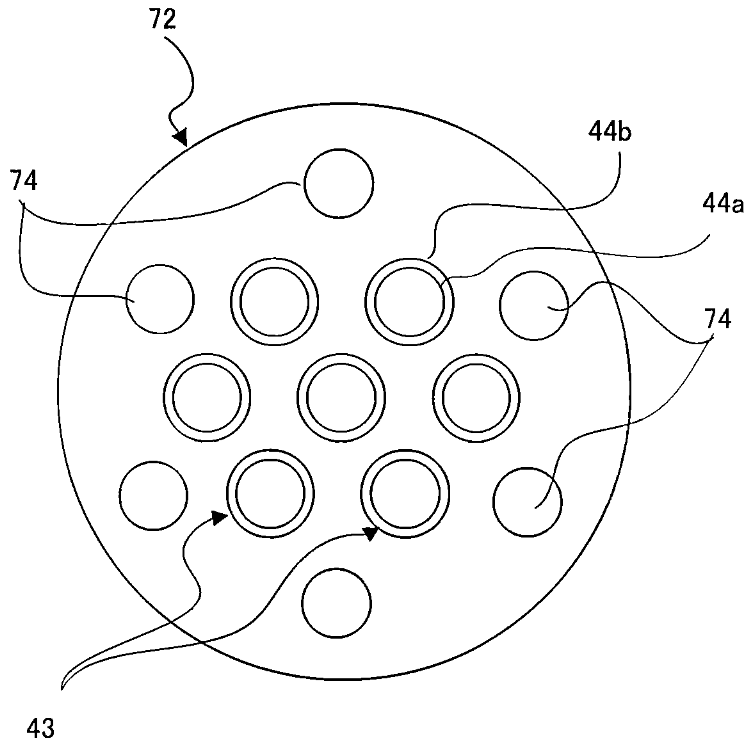
FIG. 8 is a view of another flow-regulating plate observed in the axial direction from the other end side.

FIG. 8 is a view of another flow-regulating plate 72, which is different from the flow-regulating plate 42, observed from the other end side in the axial direction. The flow-regulating plate 72 has a plurality of tapered holes 43 (FIG. 4A) as through holes penetrating in the axial direction and a plurality of cylindrical holes 74, which are not tapered holes. When the flow-regulating plate 72 is divided into two parts, namely, a central part and a circumferential part, in the radial direction, the tapered holes 43 are formed in the central part and the cylindrical holes 74 are formed in the circumferential part.

When water as a fluid to be sterilized by a liquid sterilization device 10 flows into a lead-in side space 38 through a lead-in port 34, the water spreads in the radial direction. The water on the circumferential side of the lead-in side space 38 will proceed, with the spreading thereof in the radial direction suppressed by the inner circumferential walls of a one-end-side inner tube member 17 and the other-end-side tube member 18, until reaching notch grooves 50 in the axial direction. Conversely, if the water on the circumferential side is allowed to pass through the tapered holes 43, there is an increased possibility that the flow in the axial direction desirably running along the inner circumferential wall of the lead-in side space 38 is interfered with by the tapered holes 43.

Therefore, the flow-regulating plate 72 is designed such that the water at the radially central portion thereof passes through the tapered holes 43, while the water at the circumferential portion thereof passes through the cylindrical holes 74, thus achieving higher flow regulating effect than in the case where the water in the circumferential portion is allowed to pass through the tapered holes 43.

Further, in both flow-regulating plates 42 (FIG. 4A) and 72 (FIG. 8), the plurality of tapered holes 43 are continuous in one of the array directions (vertical, horizontal or diagonal array direction), and one tapered hole 43 is not isolated from other tapered holes 43, i.e., none of the tapered holes 43 are adjacent to the cylindrical holes 74 in any array direction.

(Modified Example)

In the liquid sterilization device 10, the ultraviolet light from the circuit board 57 is applied, in the axial direction, to water, which is a fluid to be sterilized, in the sterilization space 39. A light source of ultraviolet light of the present invention may be placed outside a tube body in the radial direction such that the ultraviolet light is applied to the water in the sterilization space 39 from the radially outer side. In such a case, the liquid sterilization device 10 does not have to have a dual structure composed of the inner tube 21 and the outer tube 22, and the inner tube 21 is omitted. Further, water flows out to the lead-out port 35 directly from the sterilization space 39 without passing through the annular space 29.

In the liquid sterilization device 10, the housing 11 constitutes the tube body, and the outer tube 22 constitutes the cylindrical member. In addition, the annular space 29 is formed between the outer circumferential portion of the other-end-side tube member 18 and the inner circumferential portion of the outer tube 22. In the present invention, the annular space 29 and the notch grooves 50 can be omitted. In such a case, the lead-out port 35 opens to the sterilization space 39 in the other-end-side tube member 18 and directly communicates with the sterilization space 39 without the annular space 29 interposed therebetween.

In the liquid sterilization device 10, the quartz plate 45 is provided as a plate-like transmission member. The plate-like transmission member of the present invention can also use other materials that have a predetermined resistance to ultraviolet light, are capable of transmitting ultraviolet light, and ensure strength.

DESCRIPTION OF REFERENCE NUMERALS

10 . . . liquid sterilization device; 11 . . . housing (tube body); 12 . . . light source; 17 . . . one-end-side inner tube member; 18 . . . other-end-side tube member; 19 . . . joint portion; 20 . . . annular groove; 21 . . . inner tube; 22 . . . outer tube (cylindrical member); 29 . . . annular space; 34 . . . lead-in port; 35 . . . lead-out port; 38 . . . lead-in side space; 39 . . . sterilization space; 42, 72 . . . flow-regulating plate; 43 . . . tapered hole; 45 . . . quartz plate (plate-like transmission member); 47 . . . fixing nut; 50 . . . notch groove; 67 . . . light source; and 74 . . . cylindrical hole.

The invention claimed is:

1. A fluid sterilization device comprising:

a tube body having a tubular passage through which a fluid flowing in through an inflow port on one end side in an axial direction flows in the axial direction to an outflow port on the other end side in the axial direction;

a flow-regulating plate which has a plurality of tapered holes having diameters thereof increasing from the one end side toward the other end side in the axial direction and which is disposed in the tubular passage to divide the tubular passage into an introduction space on the one end side and a sterilization space on the other end side; and a light source which irradiates the sterilization space with ultraviolet light.

2. The fluid sterilization device according to claim 1, wherein the tube body has an outer tube and an inner tube which is positioned inside the outer tube and defines the tubular passage on an inner circumferential side, the inner tube has a first inner tube which is positioned on the one end side and defines the introduction space, and a second inner tube which is positioned on the other end side and defines the sterilization space, and the flow-regulating plate is held so that a circumferential edge of the flow-regulating plate is fitted into an annular groove formed on the inner circumferential side of a portion joining the first inner tube and the second inner tube.

3. The fluid sterilization device according to claim 2, wherein the second inner tube has a plurality of notch grooves in a circumferential direction in a circumferential edge of an opening that opens at the other end in the axial direction, the outer tube is disposed coaxially with the second inner tube and which defines an annular space in communication with the outflow port on an outer circumference side between itself and an outer circumference of the second inner tube, a quartz plate through which the ultraviolet light is transmitted comes in contact with the circumferential edge of the opening of the second inner tube to close the circumferential edge of the opening, and the light source is disposed on the other end side in the axial direction with respect to the quartz plate.

4. The fluid sterilization device according to claim 3, wherein, in a case where a thickness of the flow-regulating plate is denoted by tl, diameters of an upstream side opening and a downstream side opening as the openings on the one end side and the other end side in the axial direction, respectively, in the plurality of tapered holes, are denoted by di and do, and Ra denotes a predetermined value below 1, a relationship below is satisfied:

$$(2\cdot tl)/(di+do)<Ra.$$

5. The fluid sterilization device according to claim 2, wherein the inflow port opens to the introduction space, being opposed to the flow-regulating plate in the axial direction, and the flow-regulating plate has the plurality of tapered holes arranged in a central portion in a radial direction and a plurality of cylindrical through-holes arranged in a peripheral portion in the radial direction.

6. The fluid sterilization device according to claim 2, wherein, in a case where a thickness of the flow-regulating plate is denoted by tl, diameters of an upstream side opening and a downstream side opening as the openings on the one end side and the other end side in the axial direction, respectively, in the plurality of tapered holes, are denoted by di and do, and Ra denotes a predetermined value below 1, a relationship below is satisfied:

$$(2\cdot tl)/(di+do)<Ra.$$

7. The fluid sterilization device according to claim 1, wherein the inflow port opens to the introduction space, being opposed to the flow-regulating plate in the axial direction, and the flow-regulating plate has the plurality of tapered holes arranged in a central portion in a radial direction and a plurality of cylindrical through-holes arranged in a peripheral portion in the radial direction.

8. The fluid sterilization device according to claim 7, wherein, in a case where a thickness of the flow-regulating plate is denoted by tl, diameters of an upstream side opening and a downstream side opening as the openings on the one end side and the other end side in the axial direction, respectively, in the plurality of tapered holes, are denoted by di and do, and Ra denotes a predetermined value below 1, a relationship below is satisfied:

$$(2\cdot tl)/(di+do)<Ra.$$

9. The fluid sterilization device according to claim 7, wherein at least seven of the plurality of tapered holes are formed, and at least six of the plurality of cylindrical through-holes are formed.

10. The fluid sterilization device according to claim 1, wherein, in a case where a thickness of the flow-regulating plate is denoted by tl, diameters of an upstream side opening and a downstream side opening as the openings on the one end side and the other end side in the axial direction, respectively, in the plurality of tapered holes, are denoted by di and do, and Ra denotes a predetermined value below 1, a relationship below is satisfied:

$$(2\cdot tl)/(di+do)<Ra.$$

11. The fluid sterilization device according to claim 1, wherein the tube body has an outer tube and an inner tube which is positioned inside the outer tube and defines the tubular passage on an inner circumferential side, the inner tube has a first inner tube which is positioned on the one end side and defines the introduction space, and a second inner tube which is positioned on the other end side and defines the sterilization space, and the flow-regulating plate is held so that a circumferential edge of the flow-regulating plate is pinched by the first inner tube and the second inner tube.

12. The fluid sterilization device according to claim 1, wherein the tube body has an outer tube and an inner tube which is positioned inside the outer tube and defines the tubular passage on an inner circumferential side, the inner tube has a first inner tube which is positioned on the one end side and defines the introduction space, and a second inner tube which is positioned on the other end side and defines the sterilization space, and the flow-regulating plate is held so that a circumferential edge of the flow-regulating plate is fitted into an annular groove formed on the inner circumferential side of a portion joining the first inner tube and the second inner tube, and pinched by the first inner tube and the second inner tube.

* * * * *